(12) United States Patent
Barba

(10) Patent No.: US 7,303,167 B2
(45) Date of Patent: Dec. 4, 2007

(54) FLIGHT LOCK ACTUATOR WITH DUAL ENERGY SOURCES

(75) Inventor: Valentin G. Barba, Scotrun, PA (US)

(73) Assignee: Smith Aerospace, Whippany, NJ (US)

(*) Notice: Subject to any disclaimer, the term of this patent is extended or adjusted under 35 U.S.C. 154(b) by 0 days.

(21) Appl. No.: 11/335,949

(22) Filed: Jan. 20, 2006

(65) Prior Publication Data

US 2006/0138281 A1    Jun. 29, 2006

Related U.S. Application Data

(62) Division of application No. 10/658,930, filed on Sep. 9, 2003, now Pat. No. 7,137,595, and a division of application No. 10/260,470, filed on Sep. 26, 2002, now abandoned.

(60) Provisional application No. 60/348,881, filed on Nov. 13, 2001.

(51) Int. Cl.
*B64C 1/14* (2006.01)

(52) U.S. Cl. ............... 244/129.5; 244/118.1; 188/171

(58) Field of Classification Search ............ 244/123.3, 244/123.4, 123.5, 117 R, 118.1, 118.2, 118.3, 244/118.4, 118.5, 118.6; 292/137, 144, 163
See application file for complete search history.

(56) References Cited

U.S. PATENT DOCUMENTS

| | | | |
|---|---|---|---|
| 4,563,908 A | 1/1986 | Shube | |
| 4,681,286 A * | 7/1987 | Church et al. | ........... 244/129.5 |
| 5,180,038 A | 1/1993 | Arnold et al. | |
| 5,194,795 A | 3/1993 | Bahn et al. | |
| 5,361,024 A | 11/1994 | Wisner et al. | |
| 5,913,763 A * | 6/1999 | Beran et al. | ................... 49/506 |
| 6,622,963 B1 | 9/2003 | Ahrendt et al. | |
| 6,902,137 B2 * | 6/2005 | Brzeski et al. | ........... 244/129.5 |
| 6,951,052 B2 | 10/2005 | Clew | |

* cited by examiner

*Primary Examiner*—Timothy D. Collins
(74) *Attorney, Agent, or Firm*—Kaliko & Yeager; Scott H. Kaliko

(57) ABSTRACT

A flight-lock actuator that can be powered by two sources of stored energy when aircraft power has been switched off. A mechanical energy storage device and an electrical energy storage device provide a fully redundant energy storage system that stores sufficient energy to complete the actuator's extension stroke when aircraft power is removed. The actuator has a motor control system that limits the stroke velocity for both the extension and retraction strokes, including a damper feature capable of effectively braking the actuator during the back-driven extension stroke.

8 Claims, 3 Drawing Sheets

FLIGHT LOCK ACTUATOR WITH DUAL ENERGY SOURCES

CROSS REFERENCE TO RELATED APPLICATIONS

This application is a divisional of U.S. patent application Ser. No. 10/658,930, filed Sep. 9, 2003 now U.S. Pat. No. 7,137,595 which is a divisional of U.S. patent application Ser. No. 10/260,470, filed Sep. 26, 2002 now abandoned, which claims priority from U.S. provisional application No. 60/348,881, filed Nov. 13, 2001, both of which are hereby incorporated by reference herein in their entireties.

BACKGROUND OF THE INVENTION

This invention relates to actuators used in aircraft door lock mechanisms. More specifically, this invention relates to systems and methods for improving the reliability of aircraft door flight lock actuators. Flight lock actuators are used in aircraft door lock mechanisms to secure a lock mechanism in the locked position during flight, or whenever aircraft power is supplied to the actuator. During flight, for safety reasons, it is conventional practice to maintain the flight lock actuator in a powered stall against its locked position stop. When aircraft power is removed at the end of the flight, the flight lock actuator is conventionally returned to its unlocked position by a spring system. For safety reasons, limit switches and brakes are not permitted in flight lock actuators.

Actuators built according to the present art suffer occasional failure due to damage from abruptly impacting mechanical stops at the end of an actuator's stroke, especially while being back-driven by a spring system during the unpowered extension stroke to the unlocked position. These repeated mechanical shocks to the internal mechanism of a flight lock actuator can cause jamming and mechanical failure of the actuator. In addition, actuator failure may also result from damage to a brush-type actuator motor due to prolonged periods of powered stall in the locked position. The aircraft flight lock actuator is a key safety element in an aircraft. Any failure in the door lock mechanism, including the flight lock actuator, should be avoided.

Therefore, it would be desirable to provide a redundant stored energy system to power the flight lock actuator's extension stroke to the unlocked position stop. It would be further desirable to extend and retract the flight lock actuator to its mechanical stops in a controlled manner, so as to eliminate failure due to damage from abrupt impacts. It would be further desirable to power the flight lock actuator using a motor less prone to suffer damage from prolonged periods of powered stall.

In view of the foregoing, it is an object of this invention to provide a flight lock actuator using systems and methods that significantly improve its reliability.

SUMMARY OF THE INVENTION

These and other objects are accomplished in accordance with the principles of the present invention by providing an aircraft flight lock actuator having a redundant energy storage system, a motor control system and a brushless motor drive.

The redundant energy storage system utilizes a mechanical energy storage system and an electrical energy storage system to store sufficient energy for extending the actuator to its unlocked position after the removal of aircraft power. The electrical energy storage system stores electrical energy during the actuator's powered retraction to the locked position and during the period of powered stall in the locked position. The mechanical energy storage system also stores energy during the powered retraction stroke. The dual energy storage systems are fully redundant, which provides that energy stored in either system alone would be sufficient to drive the actuator to its unlocked position if the other energy storage system fails.

A motor control system is provided that senses the rotational speed of the flight lock actuator motor, and which limits both the retract and extend strokes to a desired maximum velocity to reduce mechanical shock. The motor control system also limits, to a desired maximum, the current supplied to the actuator motor during a period of powered stall to prevent motor damage from overheating. The motor control system also includes a damper feature that is capable of effectively braking the actuator during a back-driven extension stroke to ensure a controlled arrival into the extended position mechanical stop.

Further features of the present invention, its nature, and various advantages will be more apparent from the accompanying drawings and the following detailed description of the preferred embodiments.

DETAILED DESCRIPTION

Figure 1:
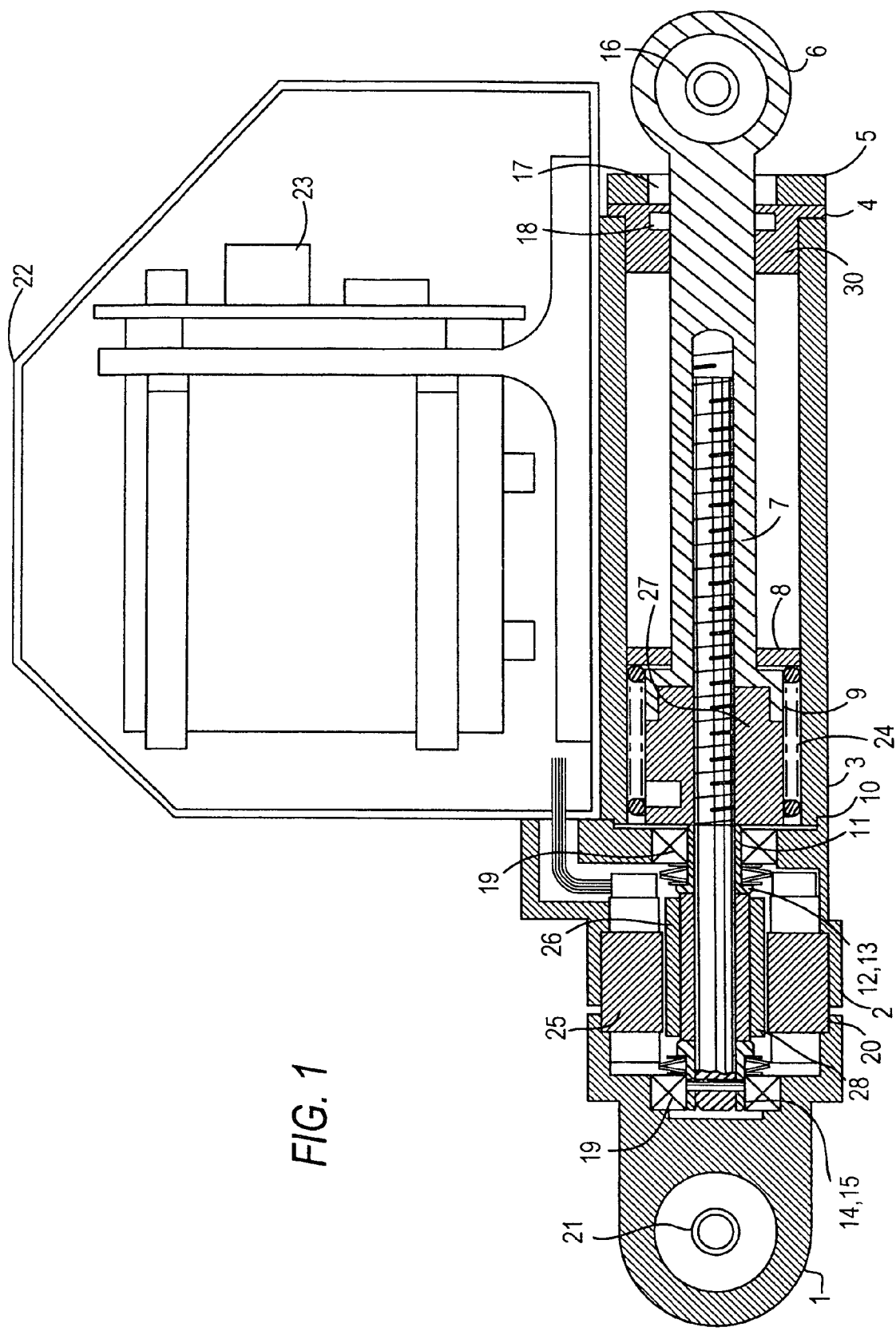
FIG. 1 is a simplified elevational view, partly in section, of an illustrative aircraft flight lock actuator mechanical system in accordance with the present invention.
Figure 1A:
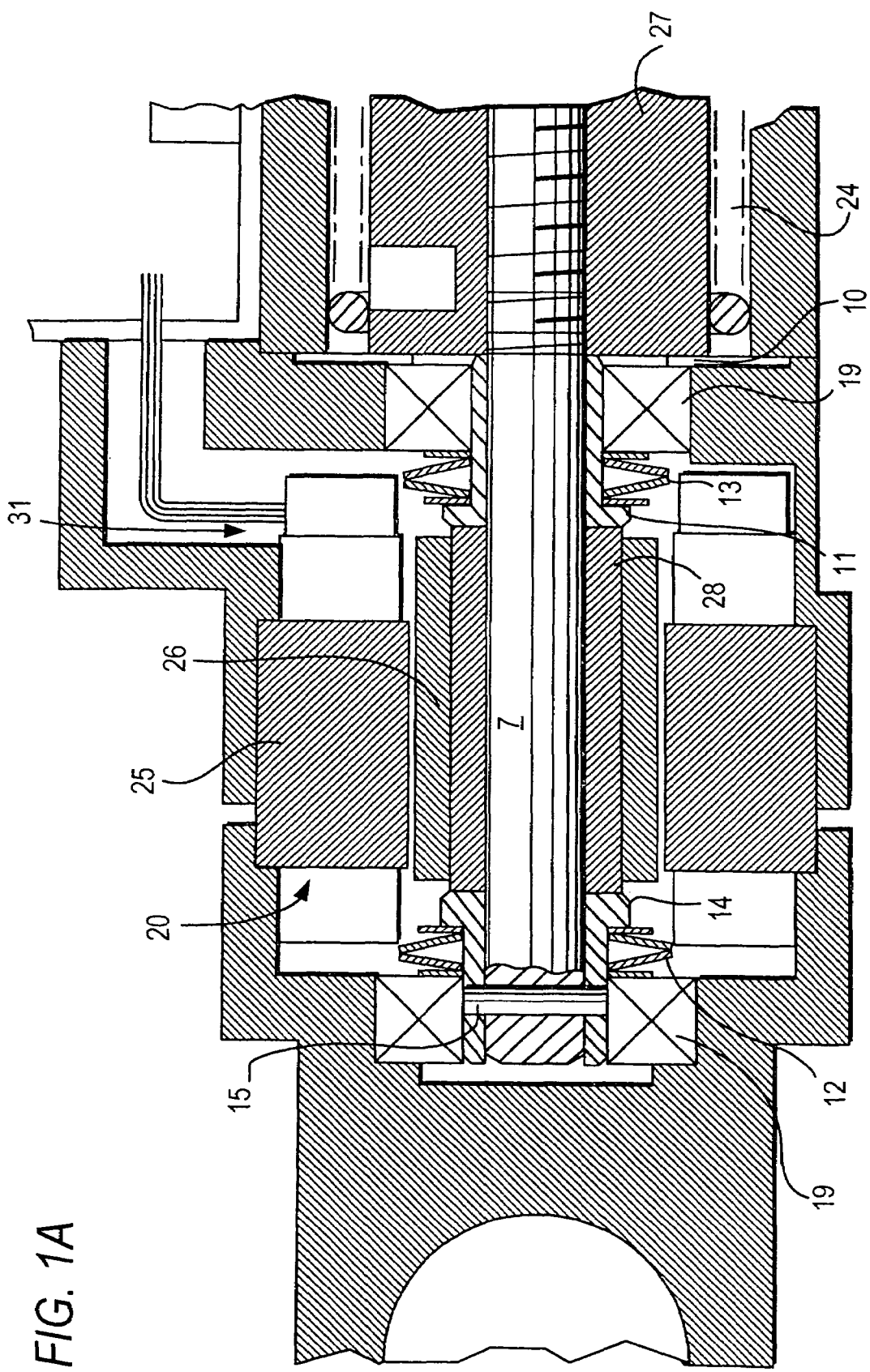
FIG. 1A is an enlargement of a portion of FIG. 1.

As shown in FIGS. 1 and 1A, an illustrative embodiment of the flight lock actuator mechanical system includes rear housing 1, center housing 2, guide tube 3, guide bushing 4, and front cover 5. Disposed within rear housing 1 and center housing 2 is a brushless DC electric motor 20, which includes stator 25 and rotor 26. Rotor 26 includes rotor shaft 28, which rotates with rotor 26. Ball screw shaft 7 is press fit into rotor shaft 28, so that ball screw shaft 7 also rotates with rotor 26. The right-hand portion of ball screw shaft 7 is threaded to provide the central element of a ball screw assembly. Ball screw shaft 7 is axially and rotationally fixed to sleeve 14. Pin 15 is captured within the inner race of bearing 19, and extends diametrically through shaft 7 and sleeve 14 to ensure the fixed relationship between elements 7 and 14.

The rotational assembly including rotor 26, shaft 7, and sleeve 14 is rotatably supported by bearings 19. Sleeves 11 and 14 are slidable inside the inner races of bearings 19 parallel to the longitudinal axis of shaft 7. The amount by which sleeves 11 and 14 can slide in this manner is limited by the compressibility of two sets, 12 and 13, of Belleville washers. Each set of Belleville washers is disposed between a set of two flat washers. The first set of Belleville washers 13 is captured between a radially outwardly extending flange on sleeve 11 and the inner race of the adjacent bearing 19, and the second set 12 is captured between a radially outwardly extending flange on sleeve 14 and the inner race of the adjacent bearing 19.

Belleville washer sets 12 and 13 nominally axially center sleeves 11 and 14 between bearings 19. However, by resiliently deforming, the sets of Belleville washers allow shaft 7 to temporarily shift to the left or right when the axially translating sleeve of ball screw 7 hits its outbound or inbound stop, respectively. The Belleville washers thereby act as resilient shock absorbers for the rotational assembly.

The output assembly includes ball nut 27, ball nut coupling 9, and output ram 6. Output ram 6 is attached to ball nut coupling 9, which is in turn attached to ball nut 27. The entire output assembly is able to translate axially inside guide tube 3. As motor 20 drives ball screw 7 to rotate, ball nut 27 is prevented from rotating by a key on collar 8 (attached to ball nut elements 9/27), which key is slidably engaged in an axial slot in guide tube 3. As ball screw 7 rotates, ball nut 27 is driven (via balls (not shown) between elements 7 and 27) to translate axially inside guide tube 3, causing the output assembly (especially output ram 6) to drive an external load through bearing 16. Conversely, linear translation of the output assembly including ball nut 27 causes ball screw 7 and motor 20 to rotate.

Helical compression spring 24 may be provided as means for mechanical energy storage. Disposed within guide tube 3, compression spring 24 is trapped between washer 10, set against center housing 2, and collar 8 that moves axially with ball nut 27. In FIGS. 1 and 1A, ball nut 27 is shown in its fully retracted position. This is the condition of the actuator mechanical system in which spring 24 is in its most compressed state. Spring 24 urges output ram 6 to extend from the fully retracted position illustrated in FIGS. 1 and 1A to a fully extended position in which collar 8 contacts stationary bushing 30 in the right-hand end (as viewed in FIGS. 1 and 1A) of guide tube 3. Spring 24 applies a spring force to output ram 6 in the direction of extension regardless of the output ram's position in guide tube 3. This includes a residual spring force applied by spring 24 in the extension direction when output ram 6 is in its fully extended position.

When motor 20 is driven in the appropriate direction by electrical power from the aircraft that includes the flight lock actuator, motor 20 is able to overcome the force of spring 24 and retract ball nut 27 all the way to contact another stationary stop at the left-hand end (as viewed in FIGS. 1 and 1A) of guide tube 3. Moreover, as long as power is thus applied to motor 20, it is able to hold ball nut 27 in the fully retracted position with spring 24 substantially compressed. When power from the aircraft is removed from the flight lock actuator, spring 24 is able to drive, even without reverse driving of motor 20 as described below, assembly 6/9/27 back to its other stop at the other (right-hand) end of guide tube 3, thereby fully extending output ram 6. Alternate means may also be used for mechanical energy storage within the scope of the present invention.

Output ram 6/9/27 is sealed with respect to guide tube 3 using seal 18 disposed in guide bushing 30. Wiper seal 17 may also be disposed in front cover 5. Guide bushing 4/30 remains stationary and functions as the internal extension stroke mechanical stop. Washer 10 functions as the internal retraction stroke mechanical stop. When ball nut 27 hits washer 10 at the end of the retraction stroke, motor 20 is able to continue to rotate briefly as Belleville washers 12 compress. Thereby reducing the impact of ball nut 27 on washer 10, and allowing motor 20 to stop somewhat gradually, rather than instantaneously. Belleville washers 12 therefore cushion the end of the retraction stroke, thereby greatly reducing the risk of damage to any part of the apparatus at the end of retraction strokes. Belleville washers 13 function similarly to cushion the end of extension strokes.

Figure 2:
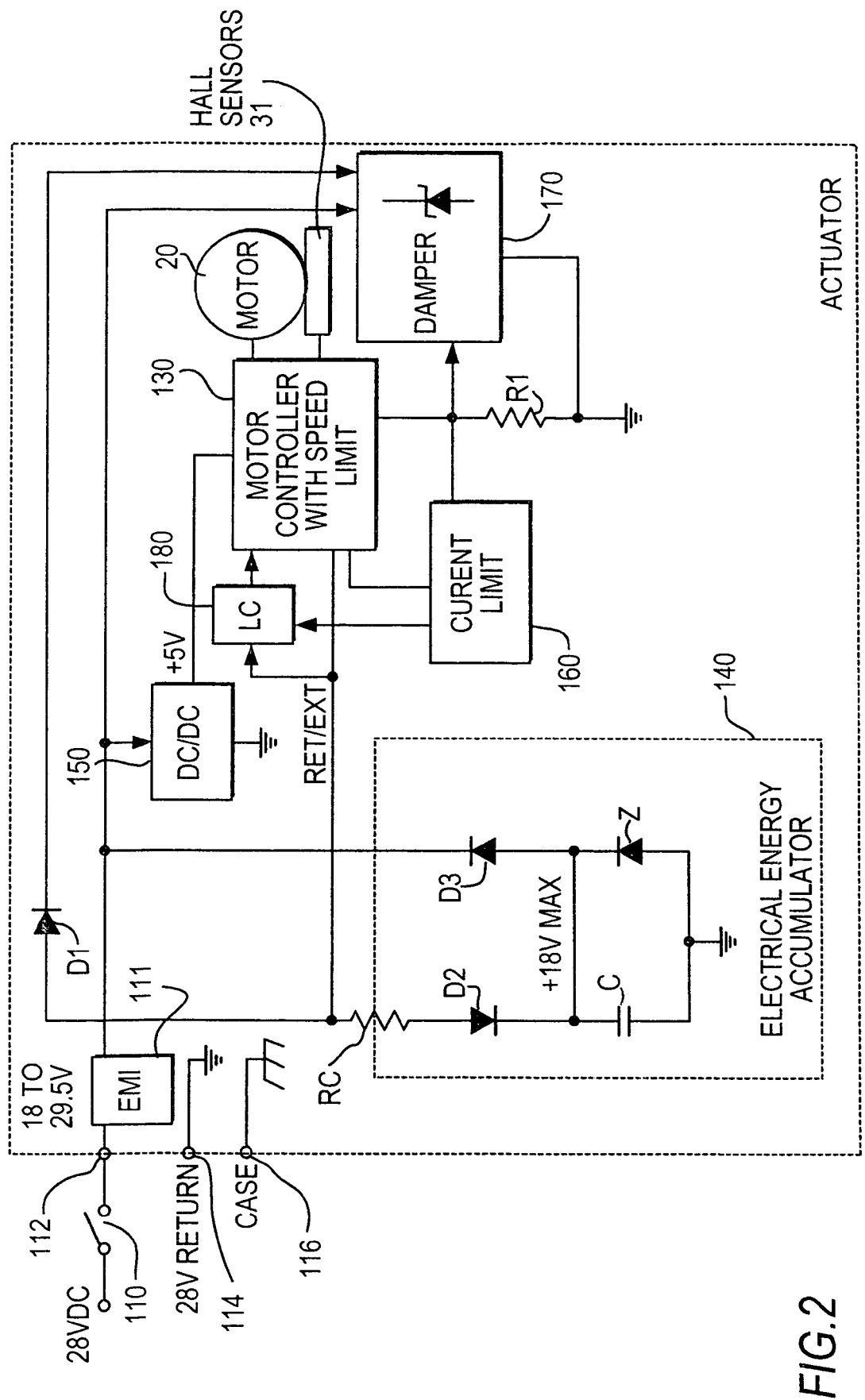
FIG. 2 is a simplified schematic block diagram of an illustrative aircraft flight lock actuator electrical system in accordance with the present invention.

A block schematic diagram of an illustrative embodiment of the flight lock actuator electrical system is shown in FIG. 2. Aircraft DC power (e.g., 28 volts DC) is received via terminal 112 when switch 110 is closed. Switch 110 is typically closed automatically when an aircraft enters a predetermined condition (e.g., a forward ground speed of a certain number of miles per hour, etc.). Switch 110 automatically re-opens when the aircraft is no longer in a condition that causes the switch to close. Electro-magnetic interference filter 111 is connected to terminal 112 to protect the flight lock actuator's electrical system from conducted and radiated interference from the aircraft's electrical system, and vice versa. Other terminals 114 and 116 (e.g., 28V RETURN and CASE ground) may also exist in the system.

From terminal 112, aircraft power is conducted to motor controller 130 through diode D1. The presence or absence of aircraft power at terminal 112 is sensed by motor controller 130 via the RET/EXT (RETRACT/EXTEND) input to the motor controller. If the signal on lead RET/EXT is "high" (e.g., 18 to 29 VDC), motor controller 130 drives motor 20 to retract the actuator to its retracted position (in which the actuator locks a door-opening mechanism of the aircraft). Motor 20 will stall the actuator in the retracted position as long as aircraft power continues to be supplied.

As means for electrical energy storage, capacitor C may be provided in electrical energy accumulator 140. When aircraft DC power is present at terminal 112, capacitor C charges through resistor Rc and diode D2. Zener diode Z sets the capacitor charge voltage upper limit at a value appropriate to proper circuit operation. When capacitor C has charged to the Zener diode breakdown value, all further charging current, limited by charging resistor Rc, bypasses capacitor C and flows to RETURN through Zener diode Z. Other suitable means for electrical energy storage may also be used within the scope of the present invention. For example, a rechargeable battery may be alternately provided in electrical energy accumulator 140 and charged using aircraft power from terminal 112.

Sensing line RET/EXT signals the removal of aircraft power by going "low" (e.g., ~0V), which signals motor controller 130 to cause any subsequently applied electrical power to rotate motor 20 in the direction required to extend the actuator to its unlocked position. After removal of aircraft DC power, power for motor 20 and for motor controller 130 during the extension stroke is provided by capacitor C through diode D3. The capacitor voltage will decay as current is drawn from electrical energy accumulator 140. However, the flight lock actuator electrical components are preferably sized so that the capacitor does not discharge below a motor controller 130 operational voltage value before the extension stroke of the actuator has been completed. Voltage regulator 150 supplies a constant control voltage for powering the control circuitry of motor controller 130 (as distinct from powering motor 20).

During either the retraction or extension stroke, motor controller 130 preferably limits stroke velocity by limiting current through motor 20. For example, such current controller limiting may be achieved by pulse-width-modulation of the motor power signal, or by reducing the voltage available to motor 20. Current through motor 20 is measured by a voltage drop across resistor R1. In order to limit impact velocity at the mechanical stops, the rotational speed of motor 20 is preferably limited, while still meeting a maximum allowable stroke time with appropriate margin. Motor 20 is typically equipped with Hall effect sensors 31 that signal the rotor's angular position to motor controller 130. Rotational speed of motor 20 may be ascertained using the frequency of the Hall effect sensors' signal. Alternately, because a permanent magnet motor generates a back-EMF proportional to its rotational speed, the generated back-EMF may be used by motor controller 130 to ascertain the rotational speed of motor 20.

If motor controller 130 senses a motor rotational speed in excess of a desired maximum speed, it may reduce the voltage available to motor 20, or may pulse-width-modulate the motor power signal, so as to drop the motor rotational speed to the desired range. If current limit circuitry 160 senses that the current passing through motor 20 is higher than a predetermined value that indicates motor 20 is in a state of powered stall, current limit circuitry 160 may signal motor controller 130 to reduce the voltage available to motor 20, or appropriately pulse-width-modulate the motor power signal, so that the current supplied during a period of powered stall does not overheat motor 20.

The flight lock actuator's extension stroke is typically subject to a substantial aiding force from spring 24 internal to the actuator and possibly also from springs external to the actuator in the aircraft door lock mechanism. In order to limit excessive extension stroke velocity caused by this aiding force, the flight lock actuator electrical system, in addition to limiting motor rotational speed by limiting the current to motor 20, may seek to effectively brake motor 20 using damper circuit 170. During the actuator's extension stroke, if current to motor 20 has been reduced to substantially zero, while motor rotational speed remains above a desired maximum speed, the flight actuator electrical system may shunt back-EMF (electro-motive force) generated by the motor into damper circuit 170 to place an electrical load on motor 20. By temporarily transforming motor 20 into such a loaded electrical generator, a braking effect is achieved on motor 20. Logic circuitry 180, having inputs from current limit circuit 160 and motor controller 130, monitors the predetermined condition for shunting current generated by motor 20 to damper circuit 170.

To elaborate the last points, a permanent magnet motor generates a back-EMF proportional to its rotational speed. This generated back-EMF, or the signal frequency of Hall effect sensors 31, may also be used by motor controller 130 to ascertain the motor rotational speed. Logic circuitry 180 may monitor motor current information from current limit circuit 160 and motor rotational speed information from motor controller 130. During the extension stroke, a motor current that is substantially zero, in combination with motor rotational speed in excess of a desired maximum speed, are signals indicating that the aiding force has driven motor 20 to an excessive speed despite motor controller 130 reducing the motor voltage or pulse width to near zero.

When logic circuitry 180 senses this condition, it reacts by throwing the motor controller 130 bridge into a full wave rectifier mode (i.e., all MOSFETs "off") to shunt all current generated by motor 20 through the MOSFETs' internal bypass diodes to a load resistor in damper circuit 170. By operating motor 20 as a generator in conjunction with the load resistor in damper circuit 170, the motor speed is reduced to a desired speed that ensures a controlled arrival into the mechanical stop.

The aircraft door flight lock actuator of the present invention utilizes a redundant energy storage system having mechanical and electrical energy storage means to store energy during the actuator's powered retraction stroke to the locked position, and subsequent period of powered stall in the locked position. Once aircraft power is removed from the flight lock actuator, the stored energy is used to power an extension stroke to the unlocked position. A brushless motor is used to power the actuator, and the actuator electrical system ensures that the motor does not overheat by limiting the current supplied to the motor to a desired maximum. The actuator electrical system ensures the controlled arrival of the actuator into its mechanical stops by limiting motor rotational speed using a current limiting method and a damper feature that effectively brakes the actuator motor. Utilizing these systems and methods, a flight lock actuator with substantially improved reliability is provided.

It will be understood that the foregoing is only illustrative of the principles of the invention, and that various modifications can be made by those skilled in the art without departing from the scope and spirit of the invention. For example, although the foregoing describes an illustrative aircraft door flight lock actuator that retracts to lock and extends to release, it should be obvious to those skilled in the art that the present invention is equally adaptable to an actuator that extends to lock and retracts to release.

What is claimed is:

1. A method for providing improved reliability in an aircraft door flight lock actuator comprising: storing energy in a mechanical energy storage means and an electrical energy storage means; powering the actuator using the energy stored in the mechanical energy storage means and the electrical energy storage means to complete an unlocking stroke in the absence of aircraft power wherein the door remains closed during unlocking; and controlling a linear velocity of the actuator.

2. The method defined in claim 1, wherein storing energy in the mechanical energy storage means comprises deforming a compression coil spring during a powered locking stroke of the actuator.

3. The method defined in claim 1, wherein storing energy in the electrical energy storage means comprises charging at least one capacitor during a powered locking stroke of the actuator, and during a subsequent powered stall of the actuator.

4. The method defined in claim 1, wherein the mechanical energy storage means and the electrical energy storage means are redundant.

5. The method defined in claim 1, wherein controlling the linear velocity of the actuator comprises: sensing a rotational speed of an actuator motor; and reducing a voltage at a motor's terminals if the rotational speed is higher than a maximum speed; and wherein controlling a current supplied to the actuator while the actuator is in the state of powered stall comprises: sensing the current supplied to the motor; and reducing the voltage at the motor's terminals if the sensed current is higher than a maximum current.

6. The method defined in claim 5, wherein controlling the linear velocity of the actuator further comprises: shunting a current generated by the motor into a damper circuit to place an electrical load on the motor if the supplied voltage is substantially zero and the rotational speed is higher than the maximum speed.

7. The method defined in claim 5, wherein sensing the rotational speed of the motor comprises measuring a frequency of a Hall effect sensor signal.

8. A system for providing improved reliability in an aircraft door flight lock actuator comprising: a means for storing energy in a mechanical energy storage means; a means for storing electrical energy; a lock actuator using the energy stored in the mechanical energy storage means and the electrical energy storage means to complete an unlocking stroke in the absence of aircraft power wherein the door remains closed during unlocking; and a means for controlling a linear velocity of the actuator.

* * * * *